United States Patent [19]

Fischer

[11] 3,855,570

[45] Dec. 17, 1974

[54] ELECTRICAL INTERCONNECT DEVICE
[75] Inventor: Allen Herbert Fischer, Affton, Mo.
[73] Assignee: International Telephone and Telegraph Corporation, New York, N.Y.
[22] Filed: Oct. 2, 1972
[21] Appl. No.: 293,925

[52] U.S. Cl................................ 339/267, 339/270
[51] Int. Cl............................................. H01r 7/08
[58] Field of Search.......... 339/267, 270, 273, 75 R, 339/60 R; 287/52.05, 124, 53 LK

[56] References Cited
UNITED STATES PATENTS
2,160,694  5/1939  Buchanan........................... 339/273
3,534,323  10/1970  Becker et al.................... 339/270 R
3,713,677  1/1973  Du Preez............................ 287/124
FOREIGN PATENTS OR APPLICATIONS
565,811  11/1944  Great Britain..................... 339/267

Primary Examiner—Jordan Franklin
Assistant Examiner—Peter Nerbun
Attorney, Agent, or Firm—James B. Raden; Marvin M. Chaban

[57] ABSTRACT

Disclosed is an interconnect device for joining two conductors or connection terminals in a connection capable of carrying high currents. For example, the device may be used at terminal connections such as transformer, switchgear or busbars, and in fully insulatable systems for underground applications or enclosed vaults. The interconnect members comprising the device allow the connection to be made through the application of considerably less torque than is normally required to produce sufficient contact pressure for the connection. The main interconnect member has a lead screw with left and right threaded section. Jam nuts mounted on the screw are constrained to axial motion on rotation of the screw. The nuts have tapered surfaces to expand sections of a concentric sleeve on rotation of the lead screw in one direction, into conductive contact with the openings at the conductor or terminal lug, or with the bore of a member affixed to the connection terminal lug, or with the bore of a member affixed to the connection terminal. Rotation of the lead screw may be effected by the use of a suitable remote device, such as the well-known "hot-stick" in place of a wrench or other torque generating force. The interconnect device may also be disconnected readily, in a power-off condition by use of the same remote device.

14 Claims, 13 Drawing Figures

PATENTED DEC 17 1974 3,855,570
SHEET 1 OF 3
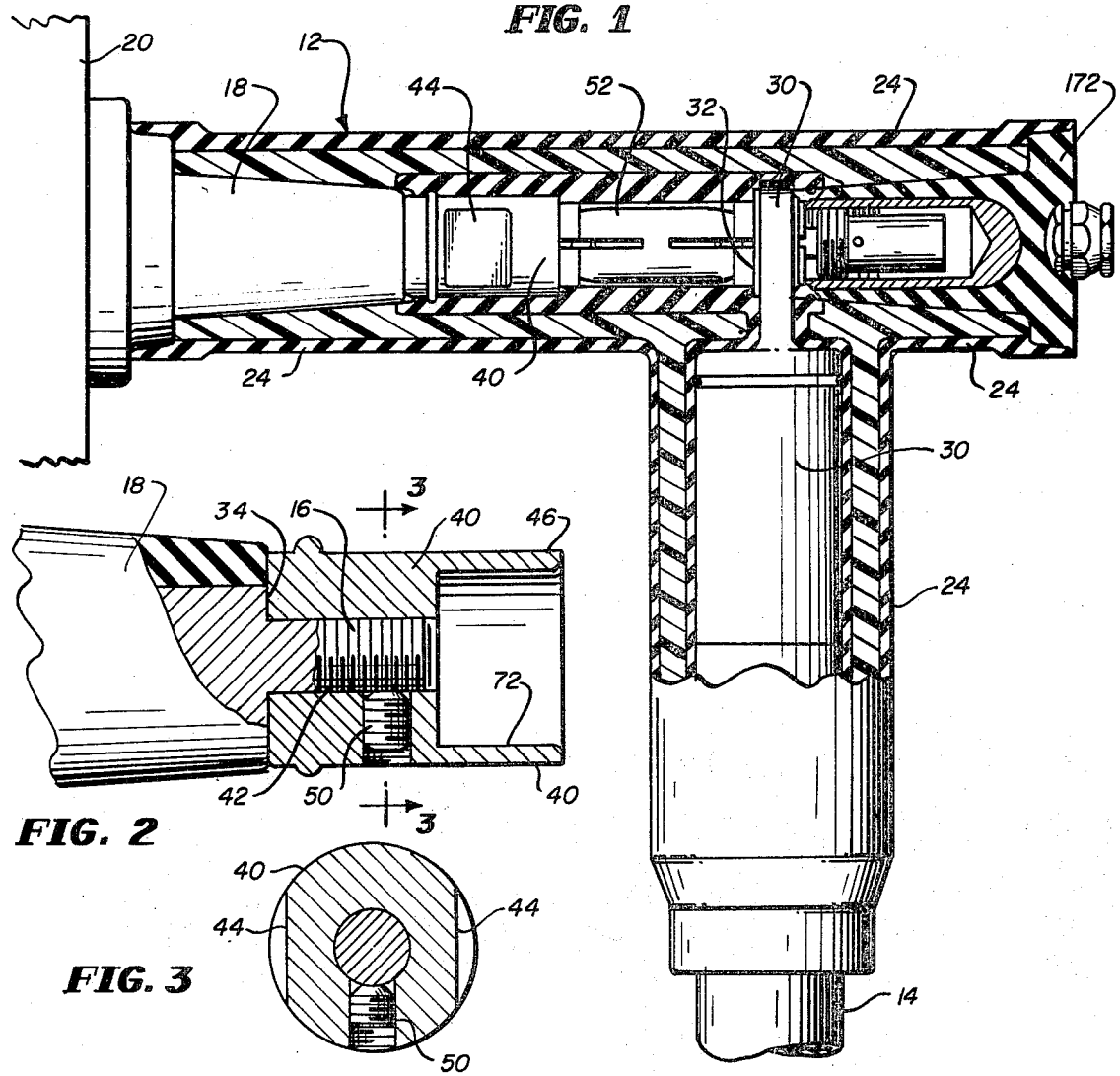
FIG. 1
FIG. 2
FIG. 3
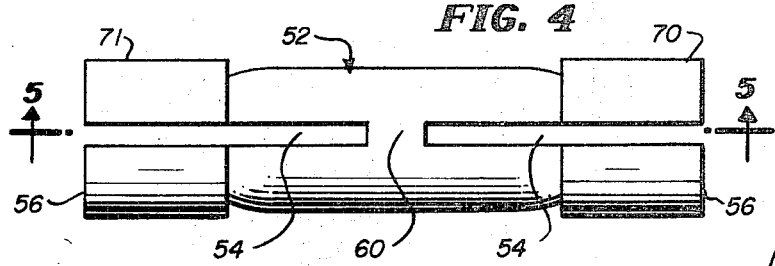
FIG. 4
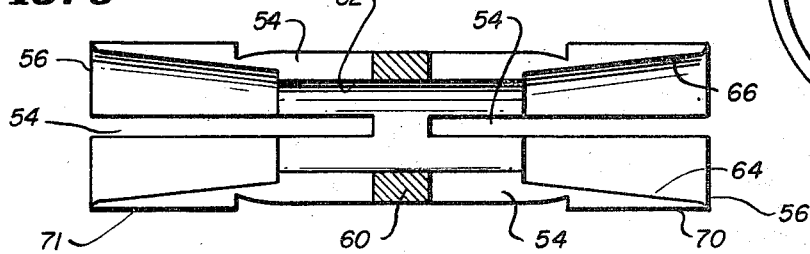
FIG. 5
FIG. 6

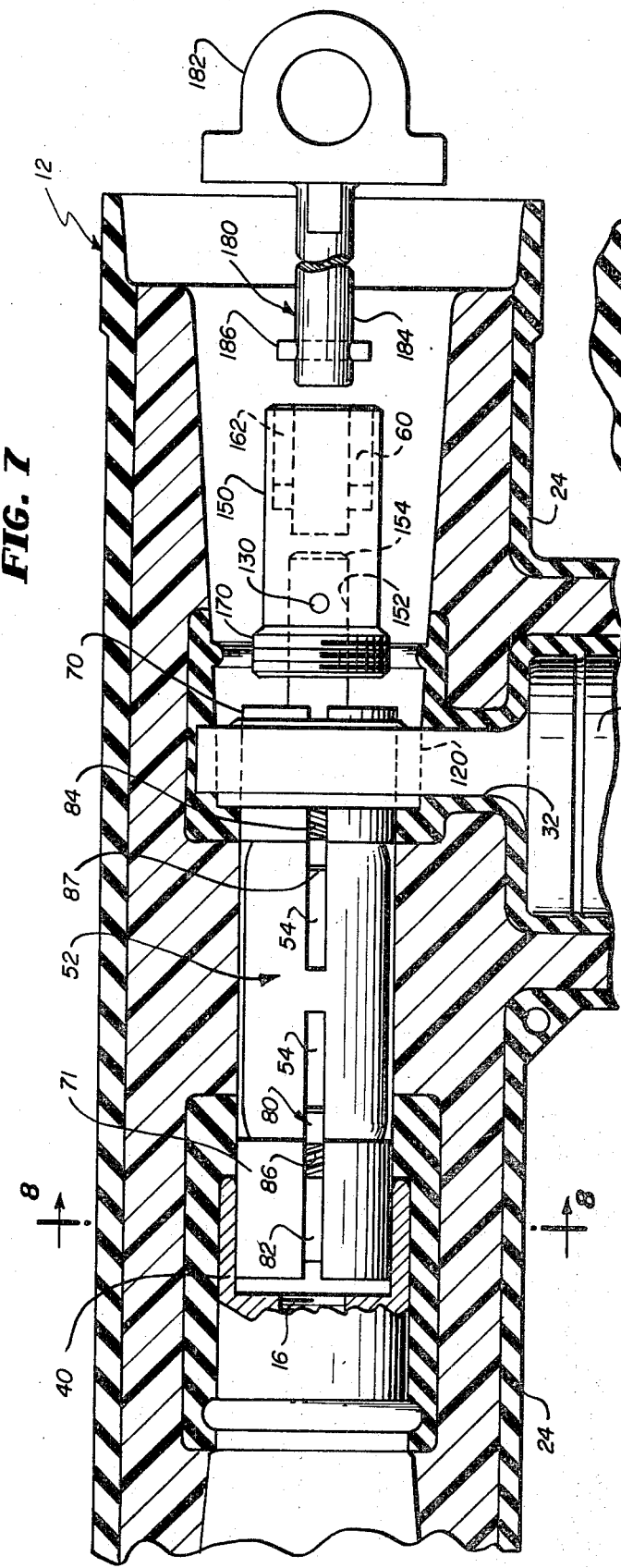
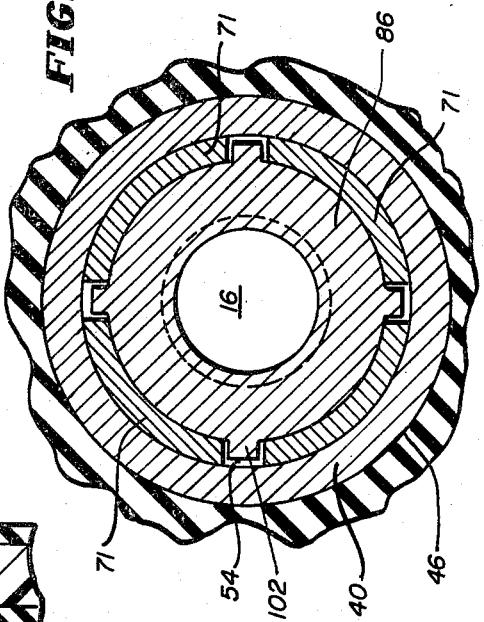
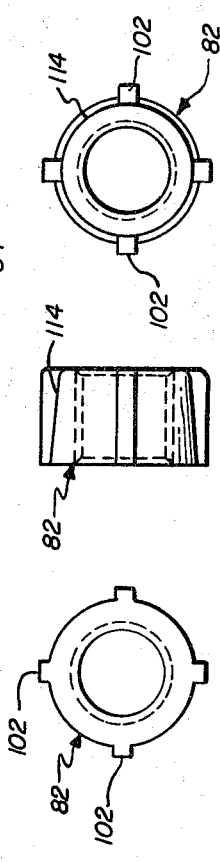

ELECTRICAL INTERCONNECT DEVICE

BACKGROUND OF THE INVENTION

Power distribution connections from switchgear, tranformers or busbars are frequently effected by the use of terminal lugs. A lug is mounted on the usual conductive bushing stud extending from the trnasformer or the like and a nut or other suitably threaded member is tightened against the outside end of the lug to drive the lug tightly against the stud and a conductive flat surface in an axially flat surface to surface connection. The tightening necessary for connections which are capable of passing currents as high as 600 amps must be effected with considerable torque, found to be in the range of 750 inch pounds. To generate this amount of torque, a wrench with a lever arm of at least ten to fifteen inches must normally be used. The wrench must be rotated through an arc for tightening or loosening the connection and this arc, of course, has as its radius the lever arm length of the wrench. Considerable force must be applied to the wrench to enable the tightening. When the connection and disconnection occur in a physically confined location, such as an underground cable vault or other enclosed chambers, the wrench may strike other cables or connections in the location, leading to many possible problems. Further, space must be provided to accommodate the wrench and those parts of the body of the user necessary to the tightening and loosening activity.

SUMMARY OF THE INVENTION

The present invention provides high amperage connection for power distribution which can be connected or disconnected (under power-off conditions) by the use of a low torque implement applied axially of the connection, such as a "hot-stick" of any conventional type.

A preferred form of my invention produces this result by providing an intermediate assembly or interconnect member which provides radially disposed expanding contact surfaces for mating engagement with both the bore of an adapter mounted on the threaded stud to which connection is to be made, and with the bore opening in the terminal lug. The intermediate assembly has two expandable sections, one adjacent each remote end of a tubular sleeve, the sleeve sections being respectively expandable or contractible jointly responsive to the application of a rotational force in a first or second direction along the axis of the sleeve. Both sleeve surfaces are slotted to expand radially outwardly into surface contact with the adjoining bore wall surfaces, the contact being developed through the mechanical advantage of two opposedly threaded sections of a lead screw rod, advancing conic-walled jam nuts axially. The conic outer surface of each jam nut slides along similarly tapered inner surfaces on the sleeves to wedge the sleeve sections tightly against the respective bores to effect hoop stresses in the respective bore surfaces.

The mechanical advantage produced by the leads screw section, the jam nuts with their inclined planes and inclined plane surfaces of the sleeve allows the contact pressure necessary for connection to be produced by the use of considerably less applied torque than had heretofore been required. I have found that contact pressure equal to that previously applied with the imposition of 750 inch pounds of torque can be developed with approximately one-third the force necessary. The interconnect member can be contracted and readily loosened from its connection by rotation in the reverse direction, and can be withdrawn axially through the lug opening. On removal of the interconnect member, there is an insulating gap between the terminal lug and conductor, the length of which is determined by the applied voltage.

It is, therefore, an object of the invention to provide a connector suitable for power distribution use which can be tightened or loosened without the need for high torquing devices or the like.

It is a further object of the invention to provide an interconnect member for conductively connecting a power connection to a terminal member through an interconnect member incorporating mechanical advantage devices to lessen the tightening forces necessary to complete a high compressive force conductive connection.

It is another object of the invention to provide a high current-carrying connection which can be connected and disconnected by an operator positioned many feet away from the connection.

It is another object of the invention to provide an interconnect member which interconnects the bores of two conductor members by the imposition of contact pressure exerted radially of the axis of the interconnect member.

It is a still further object of the invention to provide a fully insulatable and ground shieldable connection for primary power distribution which can be tightened within and detached from the outside housing without removal of the housing from the conductors being connected.

Other features, objects and advantages of the invention will become apparent from the following description viewed in conjunction with the drawings, of which the following is a brief description.

BRIEF DESCRIPTION OF THE DRAWINGS

FIG. 1 is a sectional view through the center of a first embodiment of a fully assembled connector using my invention;

FIG. 2 is a sectional view of adapter member of FIG. 1;

FIG. 3 is a sectional view taken along line 3—3 of FIG. 2;

FIG. 4 is a side view in elevation of the sleeve member of FIG. 1;

FIG. 5 is a sectional view taken along line 5—5 of FIG. 4;

FIG. 6 is an end view in elevation of the sleeve member of FIG. 4;

FIG. 7 is a sectional view generally similar to FIG. 1 with the connector end plug removed for tightening of the connection;

FIG. 8 is a sectional view taken along line 8—8 of FIG. 7;

FIG. 9 is a side view in elevation of the threaded rod used in the connector of FIG. 1;

FIGS. 10, 11 and 12 are, respectively, an end view, a side view, and an opposite end view of a jam nut designed to mate with the rod of FIG. 9 and the sleeve member of FIG. 4.

DETAILED DESCRIPTION OF THE DRAWINGS

Figure 13:
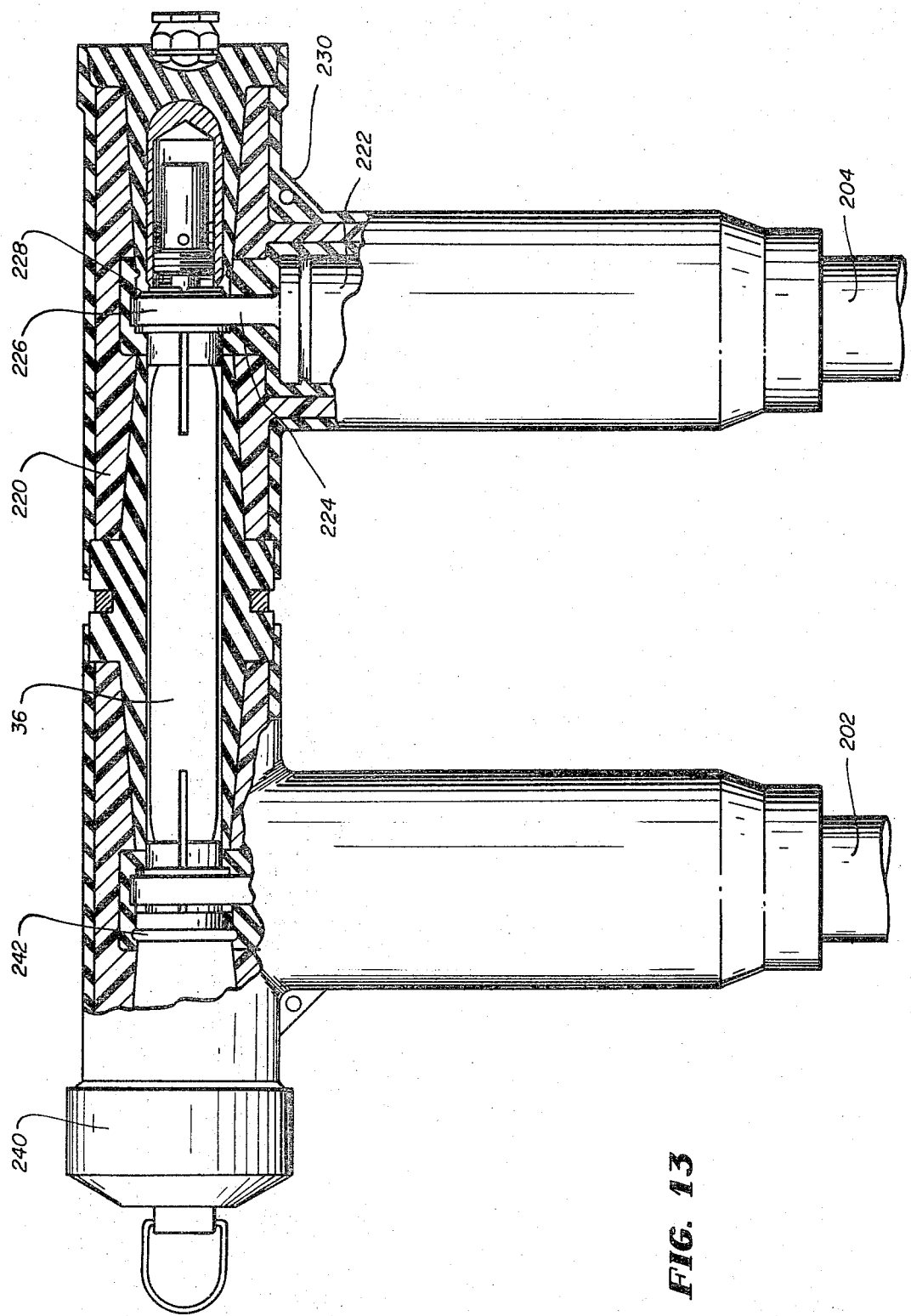
FIG. 13 is a sectional view through the center of a second embodiment of connector using my invention.

In FIG. 1, I show an insulated and shielded, primary right angle connector 12 used for primary power distribution at voltages as high as 15.2 kv and at amperages in the range of 600 amps rms, continuous. The connector 12 is designed to connect a shielded cable 14 to a threaded male stud 16 (seen best in FIG. 2) within a bushing 18 extending from the busbar, switch-gear of transformer 20. The connection is encased within and includes a suitable insulating surround housing 24, complete with external grounding shield layer, which may be of the type known genarally from U.S. Pat. No. 3,243,756 to R. C. Ruete et al. The housing 24 is a tubular T-shaped member with sealable openings at its extremities such that there is one open end for receiving the bushing, another open end for receiving the cable with terminal lug, and the third open end for connecting the lug to the stud.

The connection of cable 14 to a bushing stud 16 is performed in a manner well-known in the power distribution field. The conventional manner of connection is not shown herein but will be described briefly to aid in understanding my invention. A compression terminal lug, such as 30 used herein, is mounted directly on the stud 16. A nut (not shown) is tightened on the threaded stud by conventional wrenches and the like to lock the lug in place on the stud. One surface of the lug, such as surface 32, butts against an enlarged conductive surface 34, which protrudes slightly from the otherwise insulated bushing 18, and the butting of these two flat surfaces comprising the path for current flow from stud to terminal lug. It is clear that in order to carry current at the noted amperages and especially at elevated voltages, the surface contact pressure of the lug to the stud must be extremely tight to seat these two flat surfaces against one another suitably. Further, where the entire assembly must be insulated and its outer surface grounded, the tightening force must be applied at a distance from the terminal lug. An elongated plug including a nut may be used to insulate the housing end and transmit the torque sufficient to mate the lug to the threaded stud.

It is not unusual for up to 750 inch pounds of torque to be necessary to fully tighten such threaded connection. Torque of this magnitude must be applied with a wrench or other tool applied at right angles to the stud to enable the generation of leverage at a radial distance from the stud. Since one important field of application of connectors of the type shown herein is in underground vaults or enclosed chambers of comparatively small size, the positioning of long lever arm wrenches and the movement of these wrenches in the enclosed, environment becomes difficult and requires extreme care. To alleviate these problems, I conceived my invention.

Turning now to FIG. 1, I show my improvement in one form relative to this known form of right angle connector in joining the terminal lug 30 to the conductive stud 16 and its adjoining conductive flat surface 34. The connector shown in FIG. 1 is a fully assembled one in which intermediate interconnect assembly 36 is interposed in the current path between the lug and stud. This assembly connects to a generally cup-shaped adapter 40 with threaded female end section 42 through the cup base for firm connection on the threaded stud 16. The adapter may be fabricated of suitable aluminum or other highly conductive material. The adapter is expected to remain on the stud once threaded thereon and in the usual course of events, is not expected to be detached and removed.

The adapter as shown in FIGS. 1-3, has opposed flatted areas 44 on its outer sidewall 46 to enable the tightening of the adapter onto the stud with sufficient tightening force. A radially disposed set screw 50 through the wall of the adapter firmly holds the adapter on the stud and against the enlarged surface 34, this connection being essentially a permenant one.

Fitted into the open tubular mouth section of the adapter 40 is one end of the sleeve 52 of the interconnect assembly. The sleeve shown in detail in FIGS. 4–6, is generally tubular with four angularly spaced, diametrically opposed slots 54 incised into each axial end 56 of the sleeve. These slots extend axially from the ends of the sleeve and terminate adjacent the axial center of the sleeve leaving a wall section 60 between the ends of each slot. The center bore 62 of the sleeve is a minimum at the axial center of the sleeve, and axially outwardly of peripheral shoulders 63 toward both ends of the sleeve there is an expanded diameter bore section 64 with outwardly tapering walls 66. The external wall 70 of the sleeve has raised cylindrical end areas 71 adjacent each end to allow the sleeve raised areas to fit respectively within the tubular bore 72 of the open mouth of adapter 40 and lug 30, as shown by the completed assembly of FIG. 1.

Fitted within the sleeve and mating therewith is a double threaded lead screw rod 80, shown in detail in FIG. 9, with a pair of jam nuts 82 mounted on threaded rod sections 84 and 86. One threaded rod section 84 has a left hand thread, the other 86 a right hand thread. The jam nuts 82 are similarly threaded, one with right hand thread, the other with left hand thread. The jam nuts are mounted on respective threaded sections so that on rotation of the rod in one direction (with the sleeve held stationarily), both nuts 82 move toward one another and toward the axial center of the sleeve and on rotation of the rod in the other direction, both nuts move axially outwardly and away from one another. To prevent rotation of the sleeve, the central portion of the sleeve fits snugly within the bore of housing 24 and is held frictionally therein. Suitable O-rings 87 in suitable circumferential slots and/or pins mated in the through openings 88 in the rod, combine with shoulders 63 in the expanded bore area 64 of sleeve member 52 to hold the rod permanently within the sleeve.

The nuts 82 have raised axially elongated, spaced ribs 102 protruding from their outer tapering surface 114, the ribs being designed to ride axially within the slots in the body of the sleeve member and constrain the movement of the nuts to linear movement. As mentioned, the outer surface 114 of each nut is tapered conically; the included angle of taper is in the range of 10° to 12°. This angle is designed to provide a mechanical advantage and holding action between the surfaces. This relationship is based on the coefficient of friction of the mating surfaces and its relation to the tangent of the angle of the taper. The proper selection of this angle affords maximum mechanical advantage while minimizing the possibility of sticking during operation. The nuts are tapered outwardly, as they rest on the rod, from a minor outside diameter at the axially inward side. On movement of the nuts axially inwardly toward the sleeve center section 60, the nuts act on a like taper of the sleeve bore section 64 to cause the sleeve slotted ends to deflect radially outwardly also. This deflection causes the outer body raised areas 71 of the sleeve to deflect into tight surface contact respectively with the cylindrical bore surface of the adapter and with the bore surface of the compression terminal lug opening. The rod, nuts and sleeve are all fabricated of aluminum or the like for good conductivity therethrough.

By combining the two threaded members movable jointly, and the inclined plane movement of the jam nuts relative to the sleeve inner walls, I combine the mechanical advantage of these components to lessen greatly the tightening forces which must be applied in order to generate sufficient contact pressure. Also, with this construction, an axially self-aligning feature is achieved. In normal operation, one of the nuts rests on its tapered sleeve portion to tighten before the other. As the one tightens, it will tend to slip down the taper to move the other nut axially toward a position in which it also will be tightened by continued rotation of the lead screw rod.

The terminal lug 30 may be of any conventional type and in the usual application will be aluminum or the like. The lug has an opening or bore 120 designed to receive the stud in the normal manner. In my invention, opening 120 receives one end section of the sleeve, the other sleeve end section being fitted within the adapter bore. The adapter bore is sized essentially to agree in diameter with the bore of the terminal lug opening 120, although dissimilar sizes could be compensated for within the sleeve construction. The terminal lug in the usual form, has a cable receiving socket integrally formed at the lug end, the socket adapted to receive the cable conductor and be crimped tightly thereabout.

To rotate the lead screw rod, the rod has a diametral pin opening 130 at its remote end outside the threaded section 84. This pin opening is used to seat a drive coupling 150, as seen best in FIG. 7, mounted on the rod. This drive coupling is essentially tubular with a first bored section 152 sized to receive the unthreaded end 154 of the rod. An opening through the walls of the bored section 152 is aligned with the pin opening 130 of the rod to accept a dowel pin for joining the drive coupling to the rod. The drive coupling has at its outer end, a socket bore 160 with suitable bayonet socket receiving slots 162 in the bore walls, either inherently formed therein, or provided by a suitable insert. Each bayonet slot, as is conventional, has a straight or gently curving lead-in section and each slot terminates in a section angularly displaced from the lead-in section to receive bayonet member in a holding manner. Such mounting by the use of the bayonet type sockets and diametral pins is well-known in many arts, such as the lamp art. The configuration of the bayonet slots 162 allow a coupling drive tool 182 to be inserted into the coupling 150 and impart clockwise, counterclockwise, or axial movement of lead screw rod 80.

The outer wall of the drive coupling at the pinned end, is threaded with a male thread 170, adapted to receive a female thread of a voltage test point detection plug 172, as seen best in FIG. 1. The detection plug, of any known design, is suitably assembled onto the coupling. A plug, such as plug 172, is designed to close the tapered end opening of the connector surrounding the housing, and includes a female threaded member designed to mate with the coupling threaded portion and has a tapered insulating body or plug portion which closes the end connection opening and fully encloses the connection. In FIG. 7, the voltage test plug is shown removed from the connector surround housing 24. Removal of plug 172 exposes the coupling 150, its socket bore 160 and bayonet receiving slots 162 of the bore.

With the plug removed, as shown in FIG. 7, a coupling drive tool 180 may be inserted into the coupling 150. Tool 180 is essentially a rigid eyebolt 182 of steel or the like, with a closed loop eye section and a rigid central shaft 184 extending from the eye section. The shaft 184 has at its remote end opposed diametral bayonet pins 186 comprised of a rod or dowel pin fitted tightly through the shaft adjacent the free end.

The bayonet pins 186 slide into the coupling socket bore and mate with bayonet receiving slots 162 and join the eyebolt to the rod through the intermediate coupling. Rotation of the eyebolt causes rotation of the rod and in one direction of rotation causes expansion of the sleeve elements in a manner described previously into a tight, radially compressive, friction fit with one sleeve end tightly fitted in the adapter bore and the other sleeve end tightly engaging the terminal lug opening.

The eyebolt 182 is designed to be gripped by a suitable tool such as the well-known "hot-stick" of the type sold by Kearney-National of Atlanta, G., or by A. B. Chance of Centralia, Mo. Such sticks, as are widely used in the power distribution line work, are long insulated poles with a gripping finger at one end for permitting the user to access power equipment from a safe distance in a fully insulated manner. The most usual use of the stick if to use the gripping finger for grasping pull rings on switches and disconnect members from a safe distance. The end of the pole designed for gripping by the user has a raised, cylindrical, hand-gripping surface concentric to the pole axis. Any suitable gripping tool may, in fact, be used for environments other than that shown explicity herein.

In the present invention, the eyebolt 182 may be entered into by the gripping finger. The pole or "hot-stick" is rotated about its axis. The eye-bolt rotates the lead screw rod as the sleeve is frictionally held against rotation by the housing. Rotation either expands the sleeve in one direction of pole rotation, or loosens and releases same on rotation in the other direction. On tightening, a torque of less than 250 inch pounds has been found sufficient to develop radially effective contact pressure between the interconnect assembly and both the terminal lug and bushing stud equivalent to 750 inch pounds of torque developed by normal wrench tightening, as previously described. The pole operator may be spaced remotely from the connection and its environment during tightening and the tightening force is generated by rotating the gripping tool about its axis. Thus, the tool has little chance of striking other objects during tightening and the tightening can be undertaken within confined vaults and the like.

On rotation of the eyebolt by the tool in the loosening direction, the nuts move axially away from one another and away from the sleeve center, releasing the deflecting forces on the sleeve walls. The sleeve walls contract to disconnect the interconnection between the terminal lug and the stud adapter bore. Continued rotation of the tool further releases the sleeve and allows the sleeve to be slid axially through the lug opening and detached fully from the connection without necessitating the removal of the outer housing from the lugs and stud.

The connector, as disclosed, is designed only for power-off connection and disconnection. When disconnected with the connector sleeve removed from the housing, there is a suitable separation gap between the stud to the lug to provide a safe static, open-circuit condition. An isolation plug (not shown) of suitable insulating material may then be inserted in place of the interconnect assembly in order to effect an environmentally sealed, water-tight, submersible system.

Turning now to FIG. 13, there I show high amperage connector for connecting one cable to a second cable. Each cable has an insulating sheath 206 and may have a grounding shield 208, if, as shown, the connection is to be one installed in a primary distribution network. The grounding shield may be omitted for connections at secondary voltages and lesser voltages.

Each cable, as is well-known, has the shield stripped at an area designed to fit within the insulating housing 220 and has the insulating sheath stripped adjacent the end to allow the cable conductor to fit within the crimpable socket 222 of a terminal lug 224. The lug has a tang 226 with a bore or opening 228 essentially at right angles to the cable and the socket 222. To house and insulate two such conductive terminals, I employ two elbow housings joined together in conventional fashion.

At the elbow section indicated by the numeral 230, I provide an end plug such as plug 172, which can be removed to provide access to the aligned axial openings 228 or bores of the two terminal lugs.

An interconnect assembly 36, similar to that of the prior embodiment, is inserted through the opening provided by removal of the plug. The raised cylindrical areas 71 of the assembly sleeve 52 are aligned with the terminal lug openings and the interconnect assembly is tightened, as discussed relative to the prior embodiment.

In the embodiment of FIG. 13, the remaining end plug 240 may be held in place by the mating of a peripheral rib 242 on the inner conical plug wall with a suitable annular groove on the inner housing wall. Thus, both ends may be plugged fully insulating and shielding the interconnection although the connection and disconnection may only be effected through the one threaded end plug 172.

Further, while I have shown and described both sleeve raised sections as cylindrical and mating within cylindrical bores, at least one bore may have a suitable shape of regular configuration such as hex, square or oval shape, the shape of the sleeve being configured to mate properly with the configuration of the bore. By providing at least one bore of hex or square configuration, a holding force on the exterior of the sleeve member is provided preventing rotation of the sleeve member on rotation of the lead screw rod. In this way, I can eliminate the need for the snug fit within the housing, where such is not needed for corona prevention reasons.

While there has been described what is at present thought to be the preferred embodiments of the invention, it is understood that modifications may be made therein and it is intended to cover in the appended claims all such modifications which fall within the true spirit and scope of the invention.

I claim:

1. An electrical distribution connector interconnecting a first electrical conductor to a second electrical conductor in a connection within an insulating housing, the connection being capable of carrying elevated currents, and in which there are members having spaced-apart walled openings of regular configuration connected to each of said conductors, the invention comprising a single sleeve member, including tubular wall sections, said sleeve member inserted axially into both said openings, means for expanding the wall of said sleeve member radially at said separate sections thereof at essentially the same time to firmly engage both walled openings in compressive surface contact between said member sections and the walls of said openings, means accessible from an end of said sleeve for actuating said expanding means and said sleeve member completing a continuous conductive path between said sections for completing a connection between said first and said second conductors.

2. A connector as claimed in claim 1, in which there are operating means within said sleeve member engageable with said expanding means for operating said expanding means in one direction to produce a radially directed expansion of the sleeve member, and said operating means being operable in the reverse direction for contracting said sleeve member to release said firm engagement for removal of said sleeve member axially out of said openings to provide a dielectric spacing of one conductor from said second conductor.

3. A connector as claimed in claim 2, wherein said operating means are rotatable about the axis of said sleeve member to axially translate said expanding means.

4. A connector as claimed in claim 3 wherein said sleeve member comprises an inwardly tapered bore at each end thereof, and said expanding means comprise conic members constrained to linear movement along the axis of said sleeve member in engagement with the respective tapered bores of said sleeve member to effect said expanding movement.

5. A connector as claimed in claim 4, wherein said conic members each comprise a jam nut mounted on a common lead screw for joint movement toward and away from one another, said lead screw comprising said operating means.

6. A connection as claimed in claim 5, wherein there are opposedly threaded sections on said lead screw for slidably moving said jam nuts toward one another for expanding of said sleeve member walls, and away from one another to contract said sleeve member, said walled openings being larger than said sleeve member to allow axial removal of said sleeve member after contraction thereof.

7. An electrical connector interconnecting a primary electrical power distribution apparatus to a terminal member adapted to carry current to a ground shielded cable, a T-shaped high voltage insulating housing including three legs with said terminal member in one leg, and the cable disposed in another leg, with said terminal member having a cylindrical conductor receiving opening therein, the invention comprising a cup-shaped member affixed to said apparatus with the open face of cup-shaped member facing said terminal opening, a single conductive tubular sleeve member interposed to bridge between said cup-shaped member and said terminal opening, said sleeve member inserted axially in said cup member adjacent one end of said sleeve member and in said terminal opening adjacent the other end thereof, axial slots in a wall of said sleeve member adjacent both ends thereof to render said wall expandable and contractible, means insertable into the third leg of said housing and accessible from an end of said sleeve for expanding said sleeve member wall to firmly engage both the cup-shaped member and said terminal opening to complete a continuous conductive path within said housing from said cup member wall through said sleeve member to said terminal member.

8. A connector as claimed in claim 7, wherein said sleeve member expanding means comprises conic members mounted within said sleeve member for translatory movement parallel to the axis of said sleeve member, and means for moving said conic members inwardly from said sleeve ends to compress said sleeve member walls radially outwardly against the wall of said cup member and against the cylindrical opening of said terminal.

9. An electrical connector completing a continuous conductive path from a conductive threaded stud to a terminal lug having a conductor receiving member therein, said connector comprising an open ended member connected to said threaded stud, the invention comprising a single tubular sleeve, means rendering the sidewall of said sleeve expandable and contractible adjacent the end sections thereof, one end section of said sleeve wall inserted axially within and engaging the open ended member and the other end section thereof engaging the receiving member, means for expanding said end sections simultaneously to cause said end sections to firmly grip the open bore and terminal opening wall, said expanding means comprising cam members movable translatorily in a direction parallel to said sleeve axis toward and away from one another, and means accessible from an end of said sleeve for moving said cam members.

10. A connector as claimed in claim 9, wherein said cam members comprise conic walled jam nuts constrained to axial movement within said slots, and said moving means comprises a lead screw with opposedly threaded sections, and wherein the bore of said sleeve adjacent each end section thereof is conically tapered internally to cooperate with said conic jam nuts in expanding said sleeve end sections.

11. An electrical distribution connector adapted to interconnect a first terminal member to a second terminal member within an enclosed housing, with each terminal member having a walled receiving opening therein, the invention comprising a conductive tubular sleeve member axially insertable into an aperture in said housing and into both said openings to engage the walls of both said openings, a sidewall of the sleeve member adjacent each end thereof being expandable, means operable through said aperture for jointly expanding the sidewall of said sleeve member adjacent both ends thereof to firmly engage the walls of the openings in radially disposed compressive engagement to complete a conductive path capable of carrying currents at primary voltage levels between said terminal members within said housing.

12. A connector as claimed in claim 11, wherein one terminal member comprises a cup-shaped conductive member, and sleeve member expanding means comprises conic members slidable axially in said sleeve member in a direction parallel to the axis of said sleeve member for expanding the outer diameter of said sleeve member radially at said separate sections against the wall of said cup member and against the wall of the opening of said other terminal member.

13. A safety connector comprising in combination: (a) a T-shaped high voltage insulating housing having communicating passages in first, second and third legs thereof with said first and second legs being in axial alignment; (b) a supply conductor in the first leg of said housing; (c) a distribution conductor disposed in the third leg of said housing, said distribution conductor having a connector member disposed intermediate the first and second legs of said T-shaped housing; and (d) a single means in said aligned legs capable of insertion through said second leg for electrically joining said conductors in conductive contact, (e) means insertable into said second leg for engaging said joining means to produce a continuous conductive contact between said joining means and both conductors capable of transmitting high current from said supply conductor to said distribution conductor; and (f) wherein each of said conductors includes a terminal receiving opening, said joining means comprises terminal members capable of entering both said openings from said second leg of said housing; and (g) the engaging means comprises means accessible from an end of said joining means and manipulable from externally of said housing for expanding said terminal members into outward compressive surface contact with both said terminal receiving openings.

14. A connector as claimed in claim 13 wherein said joining means comprises a conductive tubular structure with a terminal member adjacent ends of the structure, and wherein the passage in said second leg is open at one end to allow insertion of and removal of said tubular structure, and wherein there are means internally of said tubular structure for receiving means for tightening said structure to simultaneously expand both said terminal members to complete said contact.

* * * * *